United States Patent
Leigh et al.

(10) Patent No.: US 8,121,278 B2
(45) Date of Patent: Feb. 21, 2012

(54) TELECONFERENCING SYSTEMS AND METHODS

(75) Inventors: Randolph J. Leigh, Monument, CO (US); Thomas Ray Miller, Colorado Springs, CO (US); J. Douglas Martin, Manitou Springs, CO (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 1186 days.

(21) Appl. No.: 11/831,982

(22) Filed: Aug. 1, 2007

(65) Prior Publication Data

US 2009/0034706 A1 Feb. 5, 2009

(51) Int. Cl.
*H04M 3/42* (2006.01)
*H04L 12/16* (2006.01)
*H04Q 11/00* (2006.01)

(52) U.S. Cl. .............. 379/202.01; 379/203.01; 370/260; 370/261; 370/262

(58) Field of Classification Search ............. 379/202.01, 379/203.01, 204.01, 201.01; 370/261, 260, 370/262, 259
See application file for complete search history.

(56) References Cited

U.S. PATENT DOCUMENTS

| | | |
|---|---|---|
| 5,596,635 A | 1/1997 | Rao |
| 6,763,372 B1 | 7/2004 | Dani et al. |
| 6,978,002 B1 | 12/2005 | Cope et al. |
| 7,174,365 B1 | 2/2007 | Even et al. |
| 2002/0133611 A1 | 9/2002 | Gorsuch et al. |
| 2002/0172341 A1* | 11/2002 | Wellner et al. ........... 379/202.01 |
| 2003/0021400 A1* | 1/2003 | Grandgent et al. ...... 379/202.01 |
| 2004/0107125 A1 | 6/2004 | Guheen et al. |
| 2006/0067500 A1 | 3/2006 | Christofferson et al. |
| 2006/0072728 A1* | 4/2006 | Cope et al. ............... 379/202.01 |
| 2007/0111743 A1 | 5/2007 | Leigh et al. |
| 2008/0159179 A1* | 7/2008 | Shaffer et al. ................. 370/261 |

* cited by examiner

*Primary Examiner* — Thjuan K Addy
(74) *Attorney, Agent, or Firm* — Robert A. Blaha; Smith Risley Tempel Santos LLC (57) ABSTRACT

A method implemented by a teleconferencing system includes assigning a teleconferencing bridge to a teleconference responsive to at least a current workload of the teleconferencing bridge, and forwarding a first plurality of communication sessions corresponding to the teleconference to the teleconferencing bridge, wherein the teleconferencing bridge is configured to connect each of the first plurality of communication sessions to each other communication session among the first plurality of communication sessions.

10 Claims, 10 Drawing Sheets

TELECONFERENCING SYSTEMS AND METHODS

BACKGROUND

Some teleconferences are small and include, for example, 3-10 callers. Other teleconferences are larger and can include hundreds or even thousands of callers. Even when customers make advance reservations for a teleconference, the estimated number of callers is rarely accurate, sometimes being incorrect by a factor of 2 or more. It is therefore difficult to plan which resources to assign to a teleconference to ensure adequate capacity. If capacity is exceeded while a teleconference is in progress, callers for that teleconference are required to hang up and call again to connect to the teleconference using a different telephone number.

SUMMARY

Teleconferencing systems and methods are disclosed. A teleconferencing method includes assigning a teleconferencing bridge to a teleconference responsive to at least a current workload of the teleconferencing bridge, and forwarding a first plurality of communication sessions corresponding to the teleconference to the teleconferencing bridge, wherein the teleconferencing bridge is configured to connect each of the first plurality of communication sessions to each other communication session among the first plurality of communication sessions.

A teleconferencing system includes a first server configured to assign a teleconferencing bridge to a teleconference responsive to at least a current workload of the teleconferencing bridge, and a second server configured to forward a first plurality of communication sessions corresponding to the teleconference to the teleconferencing bridge responsive to the first server assigning the teleconferencing bridge to the teleconference, wherein the teleconferencing bridge is configured to connect each of the first plurality of communication sessions to other sessions among the first plurality of communication sessions.

Another teleconferencing method includes determining a workload for a first teleconferencing bridge configured to enable a teleconference, and transferring a first plurality of communication sessions corresponding to the teleconference from the first teleconferencing bridge to a second teleconferencing bridge responsive to determining the workload of the first teleconferencing bridge, wherein the second teleconferencing bridge is configured to enable the teleconference.

Yet another teleconferencing method includes forwarding to a first teleconferencing bridge a first plurality of communication sessions corresponding to a teleconference, wherein the first teleconferencing bridge is configured to enable the teleconference, and while the first teleconferencing bridge is enabling the teleconference, assigning to the teleconference a second teleconferencing bridge configured to enable the teleconference in conjunction with the first teleconferencing bridge, and forwarding a second plurality of communication sessions corresponding to the teleconference to the second teleconferencing bridge.

Other features and advantages of the present teleconferencing systems and methods will be or become apparent to one with skill in the art upon examination of the following drawings and detailed description. It is intended that all such additional features and advantages be included within this description, be within the scope of the present systems and methods, and be protected by the accompanying claims.

BRIEF DESCRIPTION OF THE DRAWINGS

Many aspects of the teleconferencing systems and methods can be better understood with reference to the following drawings. The components in the drawings are not necessarily to scale, emphasis instead being placed upon clearly illustrating the principles of the present systems and methods. Moreover, in the drawings, like reference numerals designate corresponding parts throughout the several views.

DETAILED DESCRIPTION

Figure 1:
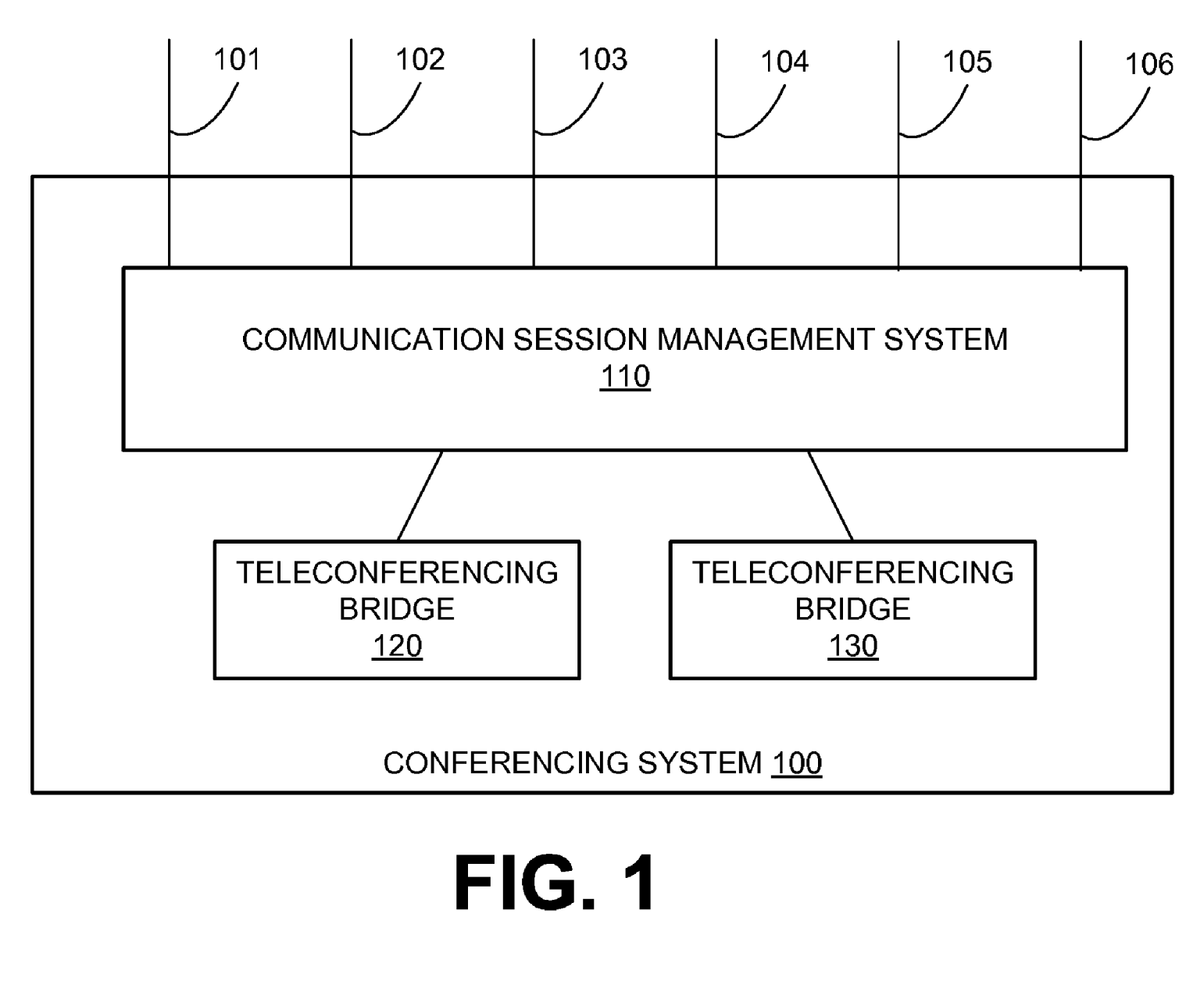
FIG. 1 is a block diagram depicting an embodiment of a teleconferencing system.

FIG. 1 is a block diagram depicting an embodiment of a teleconferencing system 100. The teleconferencing system 100 includes a communication session management system 110 and teleconferencing bridges 120 and 130. The communication session management system 110 includes, for example, one or more telephone switches, gateways, servers, and/or IP routers. The communication session management system 110 receives communication sessions, such as, for example, telephone calls, via connections 101-106 and forwards them to respective teleconferencing bridges 120 and 130. In this example, the connections 101-103 carrying respective communication sessions correspond to a first teleconference and the connections 104-106 carrying additional communication sessions correspond to a second teleconference. Note that each communication session may include audio and/or video communication data, depending on a desired implementation.

After determining which teleconferencing bridge to assign to each teleconference, the communication sessions received via connections 101-106 are forwarded to respective teleconferencing bridges 120 and 130. For example, the communication sessions received via connections 101-103 are forwarded to the teleconferencing bridge 120 and the communication sessions received via connections 104-106 are forwarded to the teleconferencing bridge 130. Note that the communication sessions corresponding to connections 101-106 would likely arrive at staggered times.

The communication session management system 110 determines which teleconferencing bridge is used for a new teleconference based on, for example, the bridge's present load, its projected peak load without the new teleconference, and its projected load if it were to handle the new teleconference. Each teleconferencing bridge can have the capacity to simultaneously handle a plurality of teleconferences. Allocating a teleconference to multiple teleconferencing bridges uses more system resources than allocating the teleconference to a single bridge. However, such allocation may be done in some cases such as when a teleconference is likely to exceed the capacity of a single bridge. A teleconference may be transferred from one teleconferencing bridge to another teleconferencing bridge to free-up teleconferencing bridge capacity for another teleconference.

Figure 2:
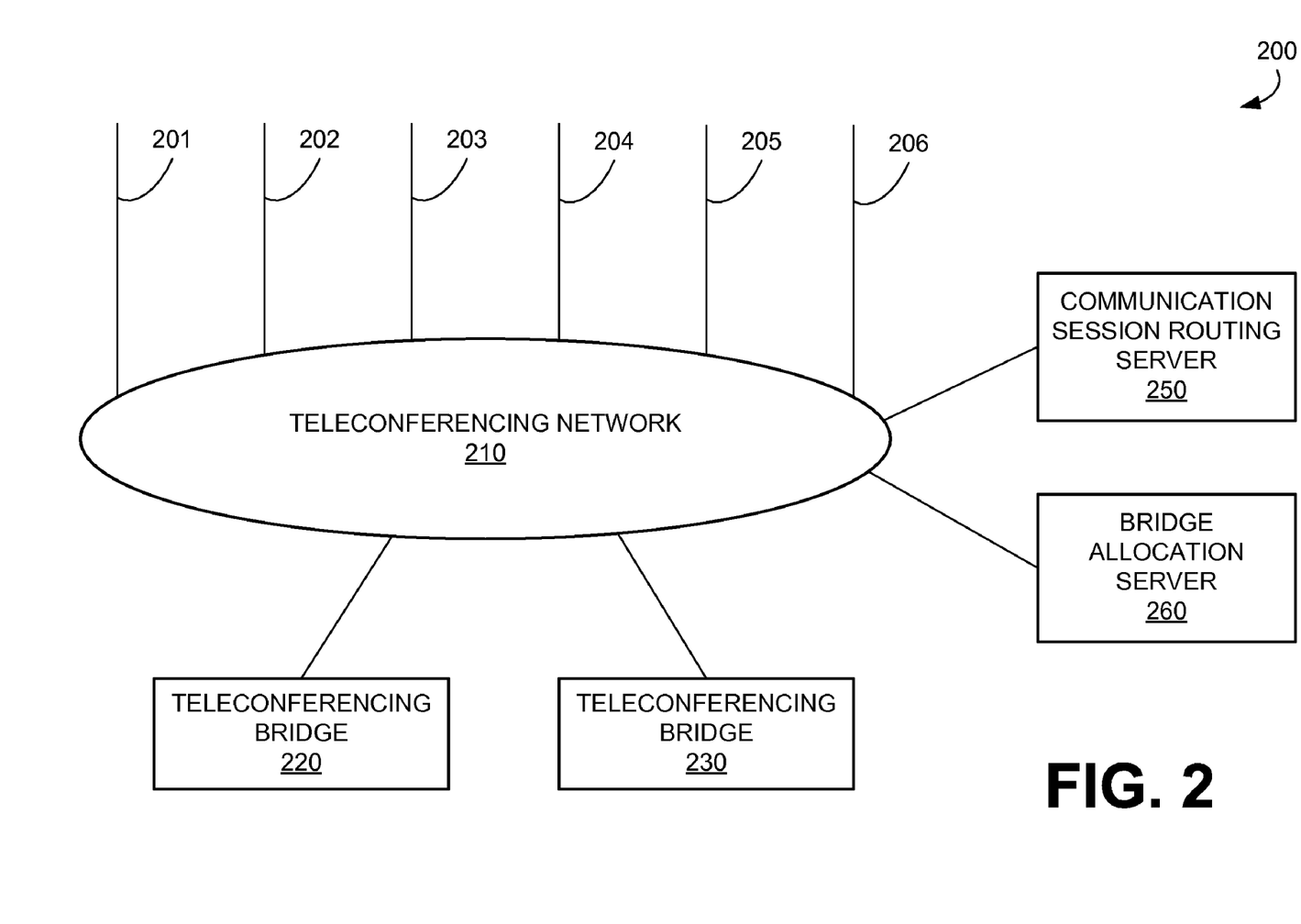
FIG. 2 is a block diagram depicting another embodiment of a teleconferencing system.

FIG. 2 is a block diagram depicting an embodiment of a teleconferencing system 200. The teleconferencing system 200 includes a teleconferencing network 210 that is coupled to teleconferencing bridges 220 and 230, a communication session routing server 250, and a bridge allocation server 260. Although only one communication session routing server 250, one bridge allocation server 260, and teleconferencing bridges 220 and 230 are shown in FIG. 2, the teleconferencing system 200 may include additional communication session routing servers, bridge allocation servers, and teleconferencing bridges, depending on a desired implementation. The teleconferencing network 210 includes, for example, one or more telephone switches, gateways, and/or IP routers.

As each communication session is received by the teleconferencing network 210 via connections 201-206, the session is forwarded to the communication session routing server 250. The communication session routing server 250 then forwards the communication session to a respective teleconferencing bridge 220 or 230 based on bridge allocation information provided by the bridge allocation server 260. For example, teleconferencing bridge 220 may be assigned to a first teleconference that includes communication sessions supported by connections 201-203 while teleconferencing bridge 230 may be assigned to a second teleconference that includes communication sessions supported by connections 204-206. The bridge allocation server 260 determines which teleconferencing bridge is to be used for a new teleconference based on, for example, the teleconferencing bridge's present load, its projected peak load without the new teleconference, and its projected load if it were to handle the new teleconference.

Figure 3:
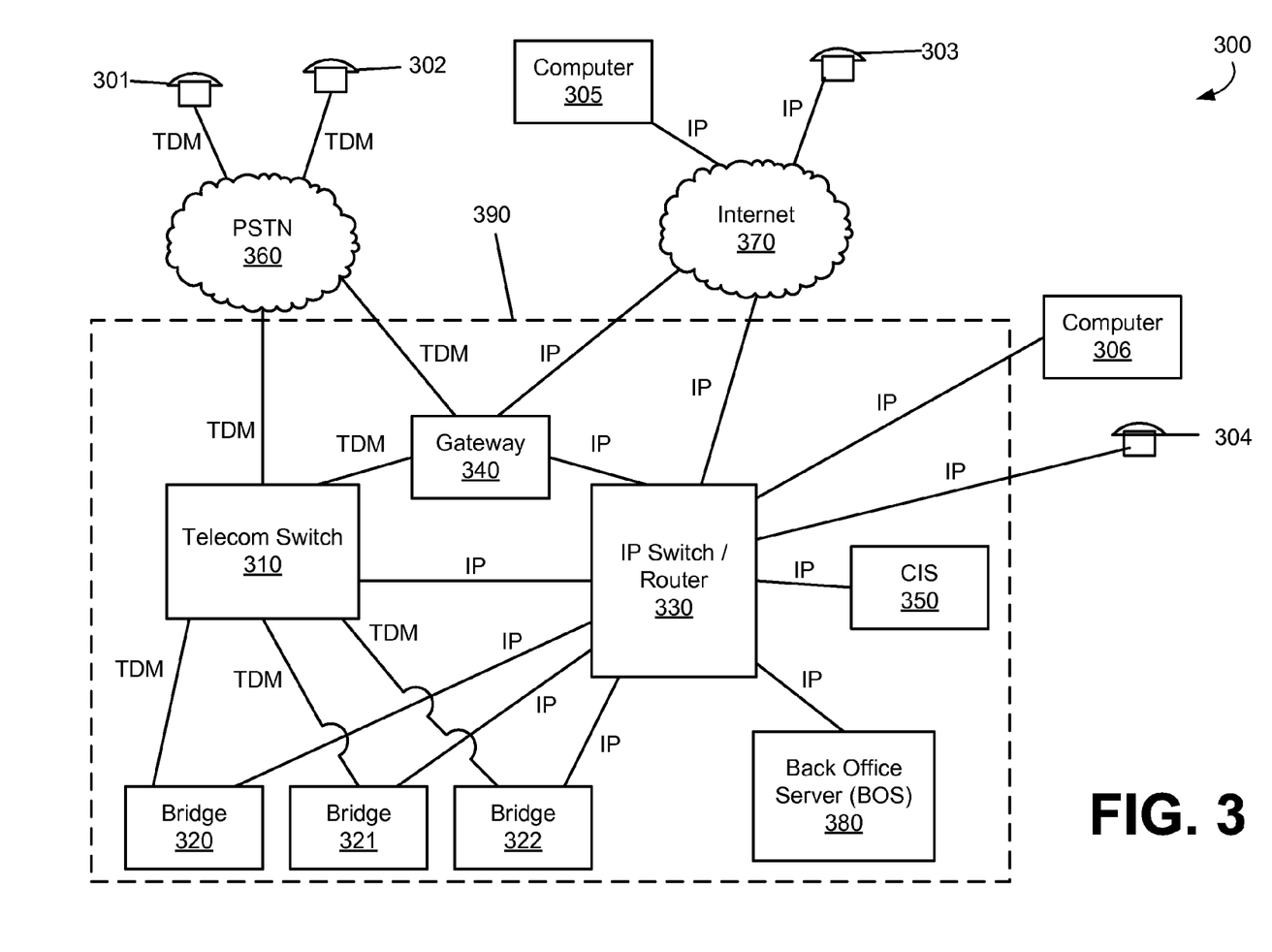
FIG. 3 is a block diagram depicting an embodiment of a communication system.

FIG. 3 is a block diagram depicting an embodiment of a communication system 300. In the example shown in FIG. 3, VoIP (voice over internet protocol) and TDM (time division multiplexing) communication technologies are employed, but other types of communication technologies can be used, depending on a desired implementation. The communication system 300 includes a teleconferencing system 390 that receives communication sessions via Public Switched Telephone Network (PSTN) 360 and/or the Internet 370.

The teleconferencing system 390 includes teleconferencing bridges 320-322 configured to enable teleconferences and a customer interaction servers (CIS) configured to forward communication sessions to respective teleconferencing bridges 320-322. The CIS 350 and each of the teleconferencing bridges 320-322 may be TDM-based or VoIP-based. In the current example shown in FIG. 3, the CIS 350 is VoIP-based, whereas the teleconferencing bridges 320-322 are TDM-based.

Callers calling the teleconferencing system 390 may be either operators or customers. To conserve TDM resources, operators may connect to the teleconferencing system 390 using VoIP from a telephone 304 and/or a computer 306. Callers using traditional telephones 301 and 302 connect to the teleconferencing system 390 through the PSTN 360. A caller using a VoIP telephone 303 can connect to the teleconferencing system 390 using the Internet 370. A caller may also connect using a VoIP telephone via a smaller-scale network such as a wide area network (WAN) or a local area network (LAN).

A communication session received via the PSTN 360 enters the teleconferencing system 390 through either a telecom switch 310 or a gateway 340, depending on the communication session flow and the capabilities of the telecom switch 310. If the telecom switch 310 includes gateway functionality, then a gateway 340 is not required. If a gateway 340 is used, it can be located at the same or different premises as the telecom switch 310 or the IP Switch/Router 330. The teleconferencing system 390 can include additional networking equipment such as, for example, firewalls and/or core routers, among others, are not shown in FIG. 3.

When a TDM communication session arrives at the telecom switch 310 from the PSTN 360, the communication session is routed through the gateway 340 and the IP switch/router 330 to a CIS 350. In an alternative embodiment, the switch 310 includes gateway functionality and gateway 340 is not used for routing the communication session to CIS 350. Although only one CIS 350 is shown in FIG. 3, other embodiments include additional CISs. In such embodiments, various call load distribution methods can be used to determine which CIS is to be used to support the communication session.

An incoming communication session will typically include a DNIS (dialed number identification service) identifier, which identifies the telephone number that the caller dialed. An incoming communication session may optionally have an ANI (automatic number identification) identifier, which identifies the caller's telephone number. The DNIS and/or ANI identifiers are forwarded to the CIS 350 along with a corresponding communication session. Note that the DNIS and/or ANI information is preserved even if a communication session is converted from TDM to VoIP format or vice versa.

The DNIS identifier of the caller is examined by the CIS 350 to determine what the specific call flow should be for that caller. For instance, one DNIS may indicate that the caller should go directly into a waiting queue to be serviced by an operator while another DNIS may indicate that a specific prompt is to be played to the caller and/or that automated information collection activity is to be performed. A waiting queue may be implemented via a CIS 350 or a bridge. In some cases where automated information collection is used, a caller may still be routed to a waiting queue. In other cases, a caller may be transferred directly to a teleconferencing bridge.

A CIS 350 can perform automated information collection via, for example, an Interactive Voice Response (IVR) system, or can link callers with human operators. Information collected about a communication session or caller can remain associated with the communication session as the communication session is transferred to different equipment within the teleconferencing system 390. A CIS 350 can use, for example, SIP (Session Initiation Protocol) as the communication session control mechanism.

In an embodiment, the CIS 350 uses a media server to provide audio and/or video information to a caller. An example of audio information provided by the CIS 350 is an audio prompt requesting a caller to make a selection or provide information. The media server may either be part of the CIS 350 or an external media server.

When a first caller for a new teleconference dials into the system and is about to be transferred to a bridge, a decision is made about which teleconferencing bridge 320, 321, or 322 to use for the new teleconference. This decision is made after the CIS 350 and/or an operator has collected sufficient information from the caller to appropriately direct the communication session.

After the teleconference corresponding to the communication session is identified, the CIS 350 signals to the BOS 380 that a teleconferencing bridge assignment is needed. Although only one BOS 380 is shown in FIG. 3, other embodiments include more than one BOS. BOSs perform overall management functions of the system, including billing, load balancing, failure detection, fail-over management and/or external control interface functions, among others. The BOS 380 may include web servers and/or other types of servers.

The BOS 380 identifies which of the teleconferencing bridges 320-322 will support the new teleconference and provides that information to the CIS 350. The CIS 350 then forwards the communication session to a designated teleconferencing bridge 320, 321, or 322. The CIS 350 also forwards subsequent communication sessions corresponding to the same teleconference as the first communication session to the designated teleconferencing bridge 320, 321, or 322. Communication sessions are routed from the CIS 350 to the designated teleconferencing bridge 320, 321, or 322 via the IP Switch 330, the gateway 340 and the telecom switch 310.

The determination of which teleconferencing bridge 320, 321, or 322 is used for a new teleconference is based on the bridge's present load, its projected load without the new teleconference, and its projected load if it were to handle the new teleconference. Each teleconferencing bridge 320, 321, or 322 can have the capacity to simultaneously handle a plurality of teleconferences. Allocating a teleconference to multiple teleconferencing bridges 320-322 uses more system resources than allocating the teleconference to a single bridge. However, such allocation may be done in some cases such as where a teleconference is likely to exceed the capacity of a single bridge. A teleconference may be transferred from one teleconferencing bridge 320, 321, or 322 to another teleconferencing bridge to free-up teleconferencing bridge capacity for another teleconference.

An embodiment of the invention uses a load distribution algorithm for allocating system resources (e.g., teleconferencing bridges 320-322). The load distribution algorithm estimates a communication session load prior to a teleconference and adapts its estimate in real-time by incorporating feedback about callers as they join the system. One way the load distribution algorithm is utilized is to estimate in advance the resources that will be required for each teleconference so that the system can effectively and efficiently allocate the anticipated teleconference load among the available resources. Another way in which the load distribution algorithm is used is to predict the maximum resources a teleconference will likely use based on the pattern of the arriving communication sessions at the beginning of the teleconference. Yet another way in which the load distribution algorithm is used is to predict when resources currently in use for a given teleconference will become available for re-use. The load distribution algorithm is implemented, for example, by one or more BOSs 380.

In an embodiment, the teleconferencing system includes the ability to track available resources of different types throughout the system. This includes but is not limited to operators, teleconferencing servers, teleconferencing ports, back-office servers, Web servers, media servers, databases, connectivity, telecom switch capacity, TDM ports, and VoIP ports. The tracking of the available resources is performed, for example, by one or more BOSs 380.

To aid in maintenance and monitoring, a direct dialing feature can be implemented to allow a caller to dial directly to a specific teleconferencing bridge 320, 321, or 322. The direct dialing feature can be accomplished by means of a special DNIS that is reserved for each bridge. This DNIS is not used by customers. The direct dialing feature allows an automated monitoring system to bypass the teleconferencing system's load balancing and CIS 350 functions and directly connect to a specific teleconferencing bridge 320, 321, or 322 to determine if it is operational. The direct dial feature can be implemented by, for example, configuring the telecom switch 310 accordingly. The telecom switch 310 can be tested to verify that it is routing a call in accordance with the direct dial feature.

Operators can connect to a CIS 350 through VoIP or TDM technology. An operator is differentiated from other callers upon connecting to the CIS 350 by means of a DNIS associated with the operator's call. The DNIS, however, only identifies the operator as being an operator but does not identify which operator is calling.

Figure 4:
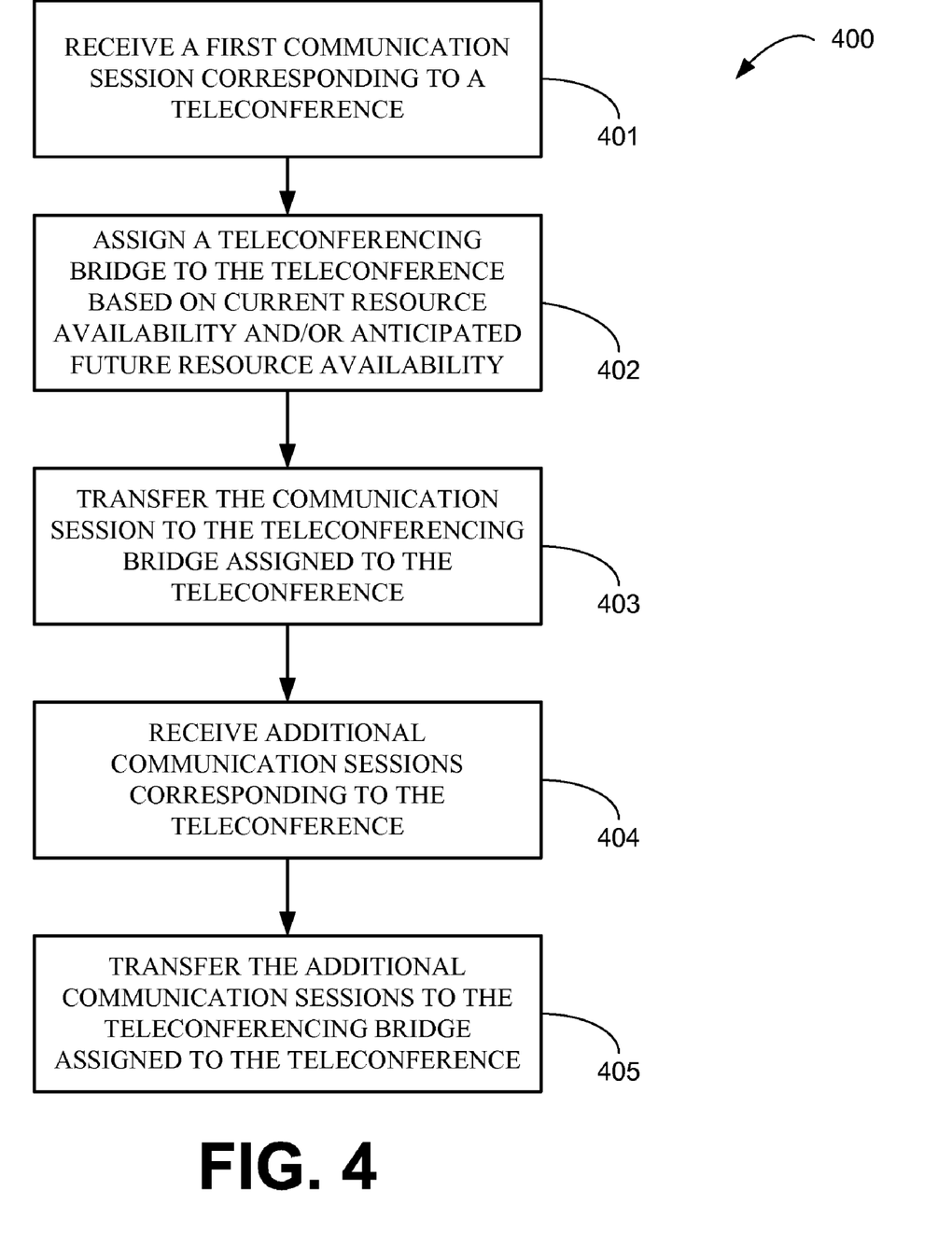
FIG. 4 is a flow chart depicting an embodiment of a communication session management method.

FIG. 4 is a flow chart depicting an embodiment of a communication session management method 400. As indicated in step 401, a first communication session corresponding to a teleconference is received. The communication session may be, for example, a TDM session or a VoIP session and may be received via, for example, a telephone switch. The teleconference is assigned to a teleconferencing bridge based on current resource availability and/or anticipated future resource availability, as indicated in step 402. For example, a load distribution algorithm as discussed above can be used to assign the teleconference to an identified teleconferencing bridge. The communication session is then transferred to the teleconferencing bridge assigned to the teleconference, as indicated in step 403. The transfer can be implemented, for example, via a telephone switch coupled to the bridge.

Additional communication sessions corresponding to the teleconference are received, as indicated in step 404. The additional communication sessions may be, for example, TDM sessions, VoIP sessions, or a combination of TDM and VoIP sessions. The additional communication sessions are then transferred to the teleconferencing bridge assigned to the teleconference, as indicated in step 405.

Figure 5A:
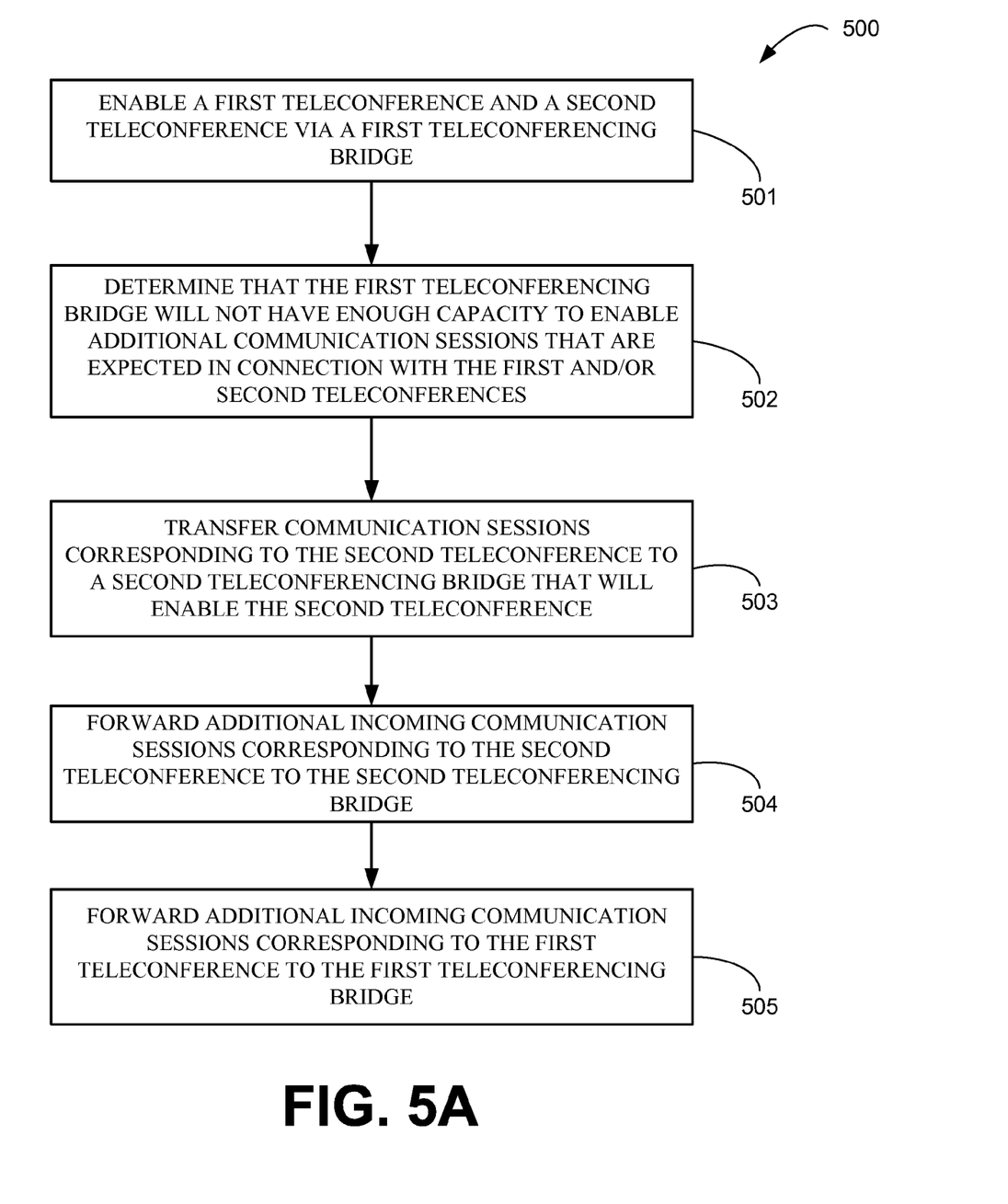
FIG. 5A is a flow chart depicting an embodiment of a teleconference transfer method.

FIG. 5A is a flow chart depicting an embodiment of a teleconference transfer method 500. As indicated in step 501, a first teleconference and a second teleconference are enabled via a first teleconferencing bridge. A determination is made that the first teleconferencing bridge will not have enough capacity to enable additional communication sessions that are expected in connection with the first and/or second teleconferences, as indicated in step 502. This determination can be made for example via a load distribution algorithm as discussed above. Communication sessions corresponding to the second teleconference are then transferred to a second teleconferencing bridge that will enable the second teleconference, as indicated in step 503. The communication sessions are transferred via, for example, a telephone switch.

Additional incoming communication sessions corresponding to the second teleconference are forwarded to the second teleconferencing bridge, as indicated in step 504. Additional incoming communication sessions corresponding to the first teleconference are forwarded to the first teleconferencing bridge, as indicated in step 505. For example, the additional incoming communication sessions corresponding to the first or second teleconference are forwarded by a caller interaction server to their respective teleconferencing bridges via a telephone switch.

Figure 5B:
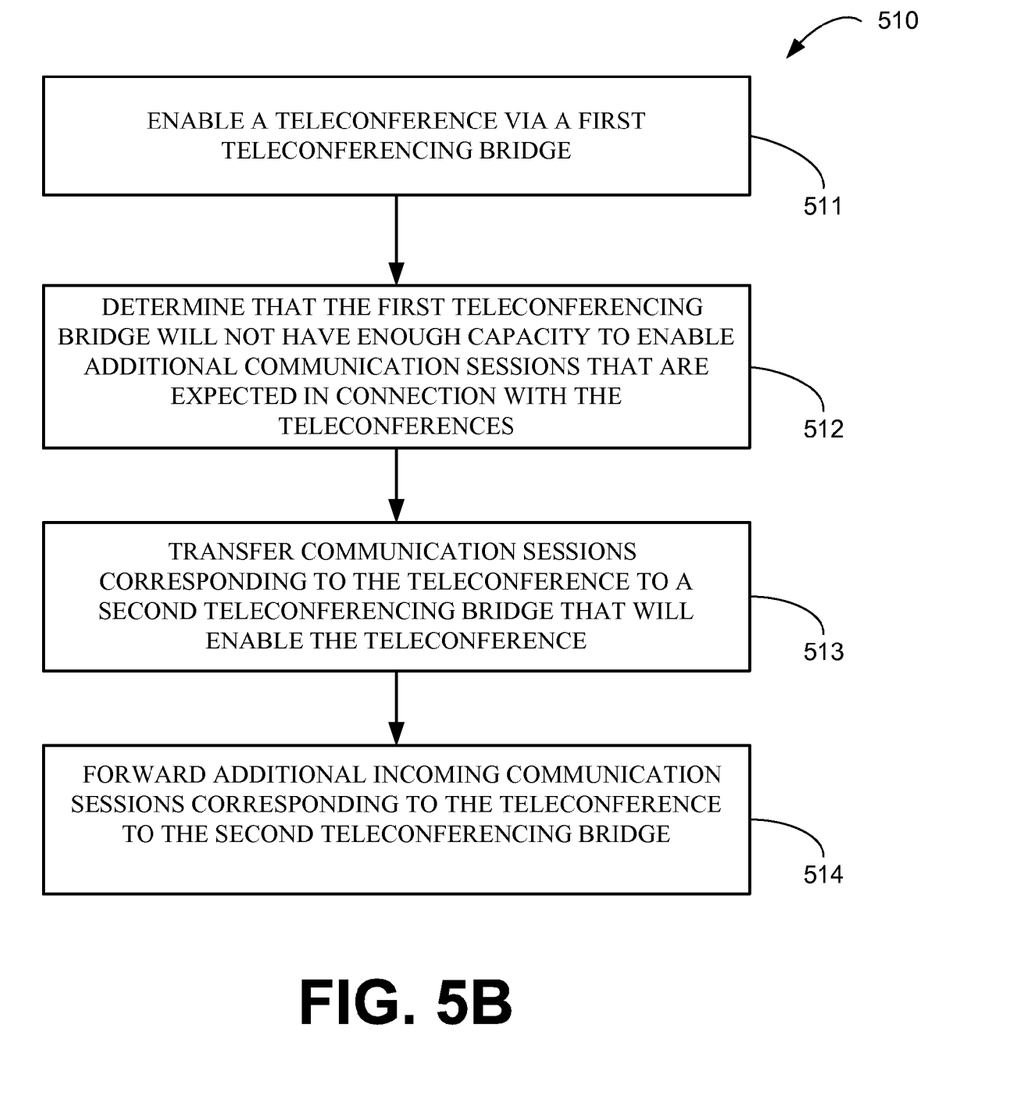
FIG. 5B is a flow chart depicting another embodiment of a teleconference transfer method.

FIG. 5B is a flow chart depicting an embodiment of a teleconference transfer method 510. As indicated in step 511, a teleconference is enabled via a first teleconferencing bridge. Then, a determination is made that the first teleconferencing bridge will not have enough capacity to enable additional communication sessions that are expected in connection with the teleconference, as indicated in step 512. This determination can be made for example via a load distribution algorithm as discussed above. Communication sessions corresponding to the teleconference are then transferred from the first teleconferencing bridge to a second teleconferencing bridge that will enable the teleconference, as indicated in step 513. The communication sessions are transferred via, for example, a telephone switch. Additional incoming communication sessions corresponding to the teleconference are then forwarded to the second teleconferencing bridge, as indicated in step 514. For example, the additional incoming communication sessions corresponding to the teleconference are forwarded by a caller interaction server to the second teleconferencing bridge.

Figure 6:
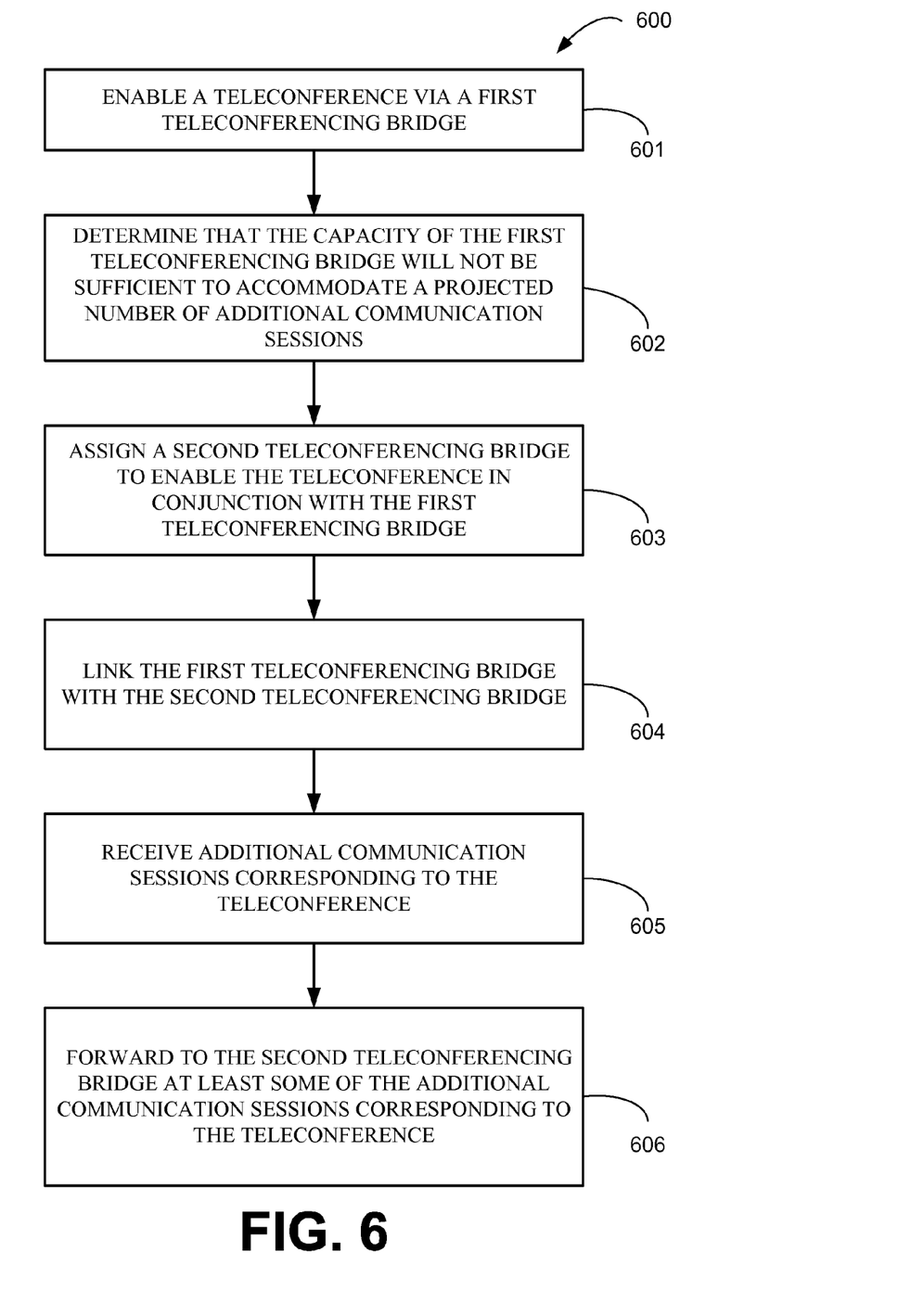
FIG. 6 is a flow chart depicting an embodiment of a communication session management method.

FIG. 6 is a flow chart depicting yet another embodiment of a communication session management method 600. As indicated in step 601, a teleconference is enabled via a first teleconferencing bridge. A determination is made that the capacity of the teleconferencing bridge will not be sufficient to accommodate a projected number of additional communication sessions for the teleconference, as indicated in step 602. This determination can be made for example via a load distribution algorithm as discussed above.

A second teleconferencing bridge is assigned to enable the teleconference in conjunction with the first teleconferencing bridge, as indicated in step 603. The assignment can be made via, for example, a back office server. The first teleconferencing bridge is then linked with the second teleconferencing bridge, as indicated in step 604. Additional communication sessions corresponding to the teleconference are received, as indicated in step 605. At least some of the additional communication sessions corresponding to the teleconference are forwarded to the second teleconferencing bridge, as indicated in step 606. For example, a caller interaction server forwards the additional communication sessions via a telephone switch.

Figure 7:
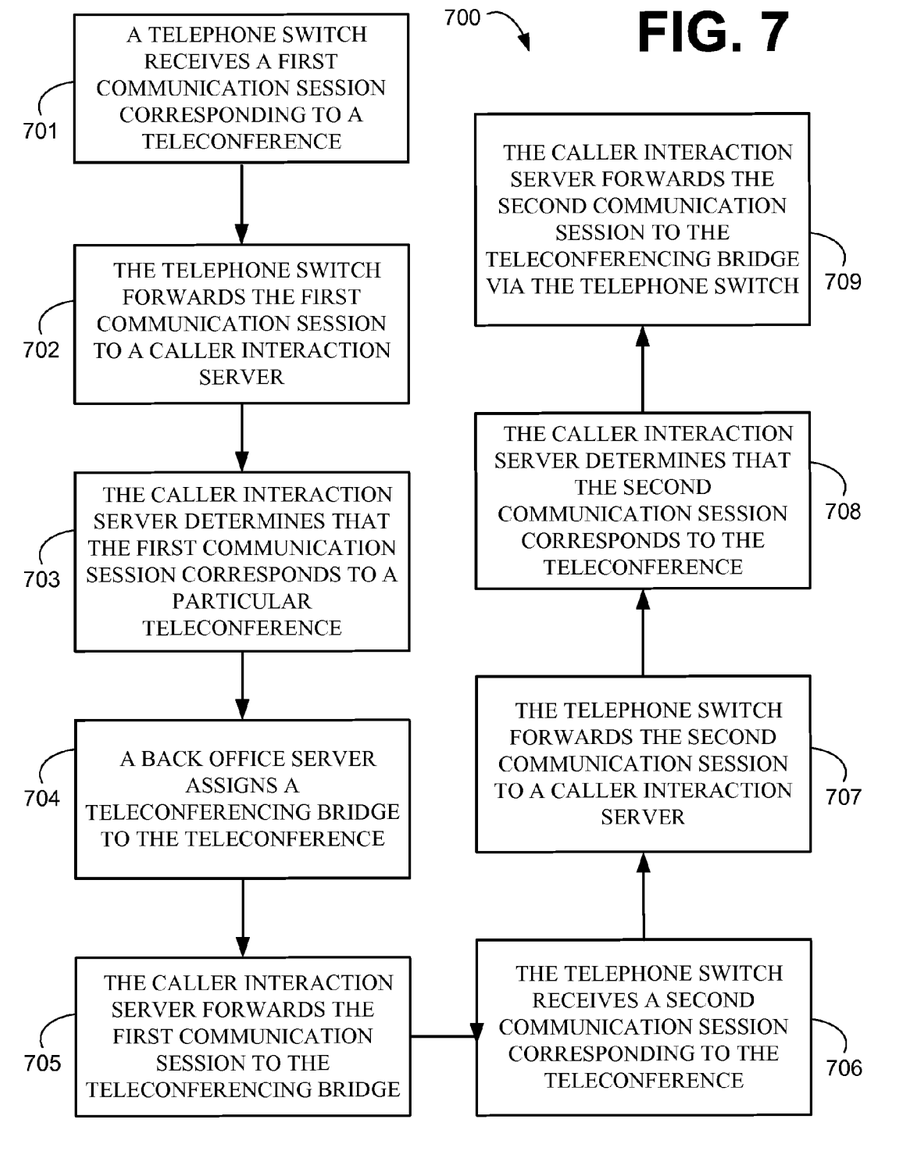
FIG. 7 is a flow chart depicting another embodiment of a communication session management method.

FIG. 7 is a flow chart depicting an embodiment of a communication session management method 700. The method 700 can be implemented, for example, via the communication system 300 shown in FIG. 3. As indicated in step 701, a telephone switch receives a first communication session corresponding to a teleconference. The telephone switch forwards the first communication session to a caller interaction server, as indicated in step 702. The caller interaction server then determines that the first communication session corresponds to a particular teleconference, as indicated in step 703. A back office server assigns a teleconferencing bridge to the teleconference, as indicated in step 704. The caller interaction server then forwards the first communication session to the assigned teleconferencing bridge, as indicated in step 705. The teleconferencing bridge is configured to enable the teleconference corresponding to the first communication session.

The telephone switch receives a second communication session corresponding to the teleconference, as indicated in step 706. The telephone switch then forwards the second communication session to a caller interaction server, as indicated in step 707. The caller interaction server determines that the second communication session corresponds to the teleconference, as indicated in step 708. The caller interaction server then forwards the second communication session to the teleconferencing bridge via the telephone switch, as indicated in step 709.

Figure 8:
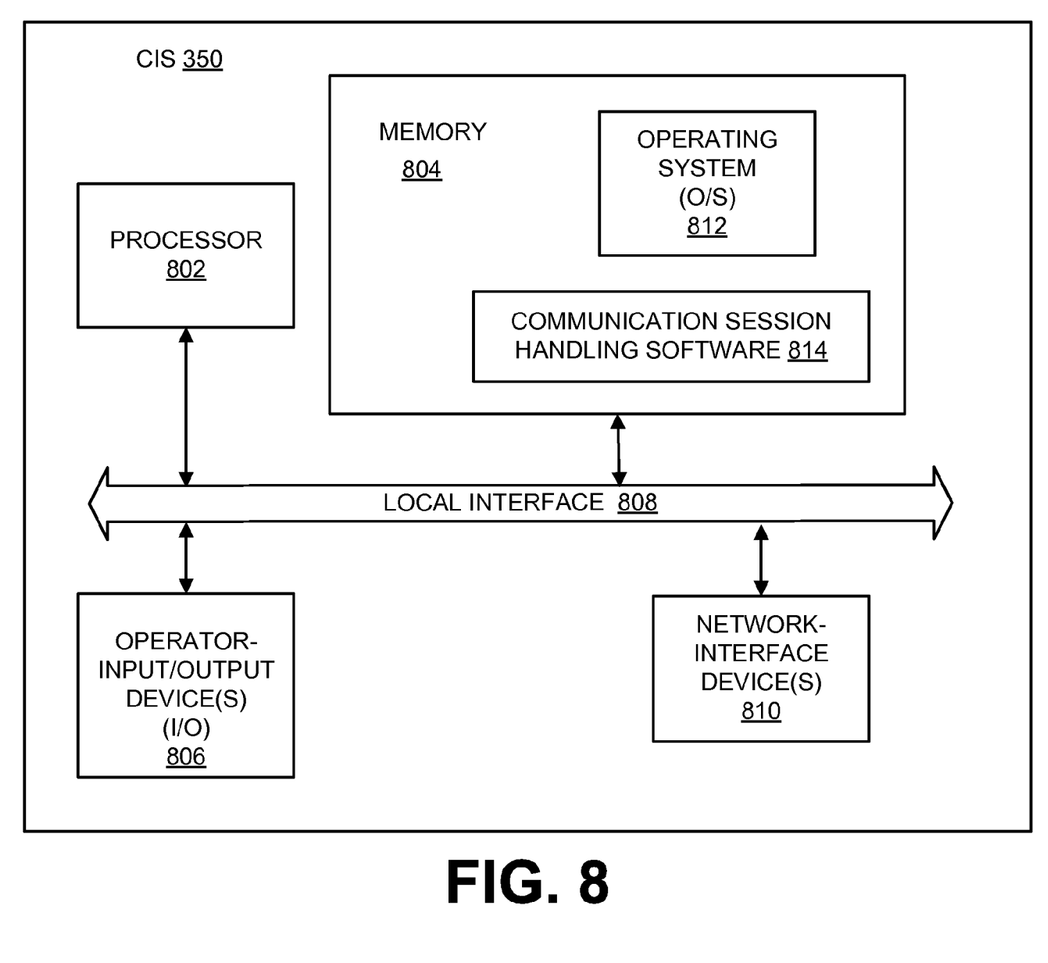
FIG. 8 is a block diagram illustrating an embodiment of a caller interaction server.

FIG. 8 is a block diagram illustrating an embodiment of a CIS 350. The CIS 350 includes a processor 802, memory 804, network interface device(s) 810, and one or more user input and/or output (I/O) device(s) 806 (or peripherals) that are communicatively coupled via a local interface 808.

The local interface 808 can be, for example but is not limited to, one or more buses or other wired or wireless connections, as is known in the art. The local interface 808 might have additional elements, which are omitted for simplicity, such as controllers, buffers (caches), drivers, repeaters, and receivers, to enable communications. Further, the local interface 808 might include address, control, and/or data connections to enable appropriate communications among the aforementioned components.

The processor 802 is a hardware device for executing software, particularly that stored in memory 804. The processor 802 can be any custom made or commercially available processor, a central processing unit (CPU), an auxiliary processor among several processors, a semiconductor based microprocessor (in the form of a microchip or chip set), or generally any device for executing software instructions.

The memory 804 can include any one or combination of volatile memory elements (e.g., RAM, such as DRAM, SRAM, SDRAM, etc.) and nonvolatile memory elements (e.g., ROM, flash memory, etc.). Moreover, the memory 804 might incorporate electronic, magnetic, optical, and/or other types of storage media. Note that the memory 804 can have a distributed architecture, where various components are situated remote from one another, but can be accessed by the processor 802.

The user I/O device(s) 806 includes input devices such as, for example but not limited to, a keyboard, a mouse, a scanner, a microphone, and/or a touch sensitive display, etc. Furthermore, the user I/O device(s) 806 also include output devices such as, for example, but not limited to, a printer, and/or a display, etc. The network interface device(s) 810 include, for example, a modem, a radio frequency (RF) or other transceiver, a telephonic interface, an Ethernet interface, a bridge, and/or a router.

Software stored in memory 804 may include one or more separate programs, each one of which comprises an ordered listing of executable instructions for implementing logical functions. In the example of FIG. 8, the software in the memory 804 includes operating system 812 and communication session handling software 814. Among other things, the operating system 812 essentially controls the execution of the communication session handling software 814 and provides scheduling, input-output control, file and data management, memory management, and communication control and related services.

The communication session handling software 814 is used by the CIS 350 to forward calls to their respective teleconferencing bridges. The communication session handling software 814 is a source program, executable program (object code), script, or any other entity comprising a set of instructions to be performed. When implemented as a source program, the communication session handling software 814 is translated via a compiler, assembler, interpreter, or the like, which may or may not be included within the memory 804, so as to operate properly in connection with the O/S 812. Furthermore, the communication session handling software 814 can be written in one or more object oriented programming languages, which have classes of data and methods, or procedure programming languages, which have routines, subroutines, and/or functions.

Figure 9:
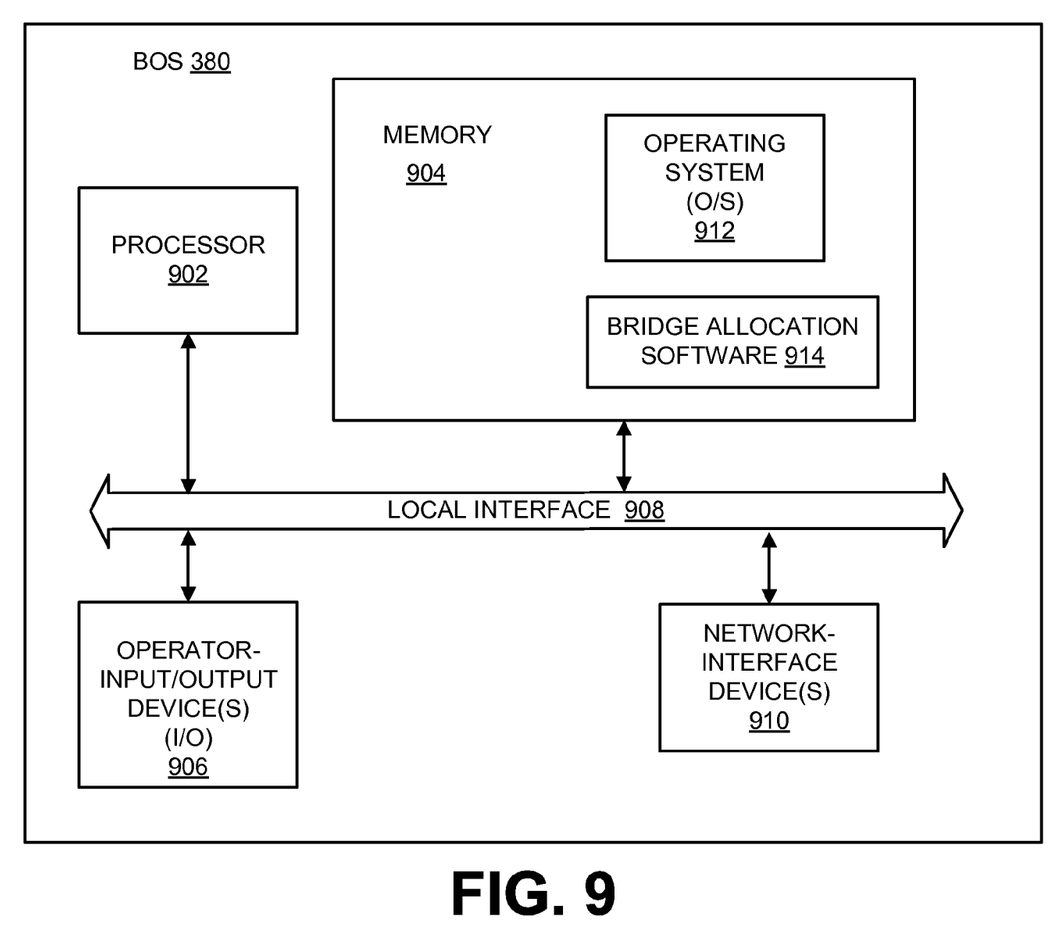
FIG. 9 is a block diagram illustrating an embodiment of a back office server.

FIG. 9 is a block diagram illustrating an embodiment of a back office server (BOS) 380. The BOS 380 includes a processor 902, memory 904, network interface device(s) 910, and one or more user input and/or output (I/O) device(s) 906 (or peripherals) that are communicatively coupled via a local interface 908.

The local interface 908 can be, for example but is not limited to, one or more buses or other wired or wireless connections, as is known in the art. The local interface 908 might have additional elements, which are omitted for simplicity, such as controllers, buffers (caches), drivers, repeaters, and receivers, to enable communications. Further, the local interface 908 might include address, control, and/or data connections to enable appropriate communications among the aforementioned components.

The processor 902 is a hardware device for executing software, particularly that stored in memory 904. The processor 902 can be any custom made or commercially available processor, a central processing unit (CPU), an auxiliary processor among several processors, a semiconductor based microprocessor (in the form of a microchip or chip set), or generally any device for executing software instructions.

The memory 904 can include any one or combination of volatile memory elements (e.g., RAM, such as DRAM, SRAM, SDRAM, etc.) and nonvolatile memory elements (e.g., ROM, flash memory, etc.). Moreover, the memory 904 might incorporate electronic, magnetic, optical, and/or other types of storage media. Note that the memory 904 can have a distributed architecture, where various components are situated remote from one another, but can be accessed by the processor 902.

The user I/O device(s) 906 includes input devices such as, for example but not limited to, a keyboard, a mouse, a scanner, a microphone, and/or a touch sensitive display, etc. Furthermore, the user I/O device(s) 906 also include output devices such as, for example, but not limited to, a printer, a speaker, and/or a display, etc. The network interface device(s) 910 include, for example, a modem, a radio frequency (RF) or other transceiver, a telephonic interface, an Ethernet interface, a bridge, and/or a router.

Software stored in memory 904 may include one or more separate programs, each one of which comprises an ordered listing of executable instructions for implementing logical functions. In the example of FIG. 9, the software in the memory 904 includes operating system 912 and teleconferencing bridge allocation software 914. Among other things, the operating system 912 essentially controls the execution of the teleconferencing bridge allocation software 914 and provides scheduling, input-output control, file and data management, memory management, and communication control and related services.

The teleconferencing bridge allocation software 914 is used by the BOS 380 to determine which teleconferencing bridge or bridges to assign to a teleconference. The teleconferencing bridge allocation software 914 is a source program, executable program (object code), script, or any other entity comprising a set of instructions to be performed. When implemented as a source program, the teleconferencing bridge allocation software 914 is translated via a compiler, assembler, interpreter, or the like, which may or may not be included within the memory 904, so as to operate properly in connection with the O/S 912. Furthermore, the teleconferencing bridge allocation software 914 can be written in one or more object oriented programming languages, which have classes of data and methods, or procedure programming languages, which have routines, subroutines, and/or functions.

It should be emphasized that the above-described embodiments of the present systems and methods, particularly, any "preferred" embodiments, are merely possible examples of implementations, merely set forth for a clear understanding of the principles of managing communication sessions coupled to a teleconference system. Many variations and modifications may be made to the above-described embodiment(s) without departing substantially from the disclosed principles. All such modifications and variations are intended to be included herein within the scope of this disclosure and protected by the claims.

Therefore, having thus described the teleconferencing systems and methods, at least the following is claimed:

1. A method implemented by a teleconferencing system, comprising:
   assigning a first teleconferencing bridge to a teleconference, wherein the assignment is responsive to a projected future workload of the first teleconference bridge during the teleconference;
   forwarding, responsive to the assignment of the teleconferencing bridge to the teleconference, a first plurality of communication sessions corresponding to the teleconference to the first teleconferencing bridge, wherein the first teleconferencing bridge is configured to connect each of the first plurality of communication sessions to each other communication session among the first plurality of communication sessions;
   determining that the capacity of the first teleconferencing bridge will be insufficient to accommodate a projected number of additional communication sessions to support the teleconference;
   assigning at least one additional teleconferencing bridge to the teleconference;
   linking the first teleconferencing bridge to the at least one additional teleconferencing bridge;
   receiving additional communication sessions for the teleconference; and
   forwarding to the at least one additional teleconferencing bridge at least one of the additional communication sessions.

2. The method of claim 1, wherein assigning the first teleconferencing bridge to the teleconference is also responsive to the projected future workload and a workload capacity of at least one other teleconferencing bridge.

3. The method of claim 1, wherein assigning the first teleconferencing bridge to the teleconference is performed after a communication session corresponding to the teleconference is received by the teleconferencing system.

4. The method of claim 1, wherein assigning the first teleconferencing bridge to the teleconference is performed by a back office server in the teleconferencing system.

5. The method of claim 4, wherein forwarding the first plurality of communication sessions corresponding to the teleconference to the at least one additional teleconferencing bridge is performed by at least one caller interaction server responsive to teleconferencing bridge assignment information provided to the caller interaction server by the back office server.

6. A teleconferencing system comprising:
   a first server configured to assign a first teleconferencing bridge to a teleconference responsive to at least a projected future workload of the first teleconferencing bridge; and
   a second server coupled to the first server via a teleconferencing network and configured to forward, responsive to the assignment by the first server of the first teleconferencing bridge to the teleconference, a first plurality of communication sessions corresponding to the teleconference to the first teleconferencing bridge, wherein the first teleconferencing bridge is configured to connect each of the first plurality of communication sessions to other sessions among the first plurality of communication sessions and wherein one of the first server and the second server are further configured to transfer, responsive to a determination that the first teleconferencing bridge has insufficient capacity to accommodate a projected future workload for the first teleconferencing bridge, a subset of the first plurality of communication sessions corresponding to the teleconference from the first teleconferencing bridge to a second teleconferencing bridge, wherein the first teleconferencing bridge and the second teleconferencing bridge are linked to jointly enable the teleconference.

7. The teleconferencing system of claim 6, wherein the second server is further configured to assign at least one additional communication session corresponding to the teleconference to the second teleconferencing bridge.

8. The teleconferencing system of claim 6, wherein the first server is configured to assign the first teleconferencing bridge to the teleconference responsive to the projected future workload and workload capacity of at least one other bridge.

9. The teleconferencing system of claim 6, wherein the first server is configured to assign the first teleconferencing bridge to the teleconference after a communication session corresponding to the teleconference is received by the teleconferencing system.

10. The teleconferencing system of claim 6, wherein the first server is a back office server and the second server is a caller interaction server.

* * * * *